US010190661B2

(12) United States Patent
Gwon et al.

(10) Patent No.: US 10,190,661 B2
(45) Date of Patent: Jan. 29, 2019

(54) TRANSMISSION FOR VEHICLE

(71) Applicant: Hyundai Motor Company, Seoul (KR)

(72) Inventors: Yeo Hyeon Gwon, Yongin-Si (KR); Choung Wan Son, Seoul (KR); Chang Yeon Cho, Seoul (KR); Hyun Chul Kim, Suwon-Si (KR); Jin Beom Seo, Suwon-Si (KR); Ki Jong Park, Osan-Si (KR)

(73) Assignee: Hyundai Motor Company, Seoul (KR)

( * ) Notice: Subject to any disclaimer, the term of this patent is extended or adjusted under 35 U.S.C. 154(b) by 603 days.

(21) Appl. No.: 14/936,470

(22) Filed: Nov. 9, 2015

(65) Prior Publication Data

US 2017/0023104 A1 Jan. 26, 2017

(30) Foreign Application Priority Data

Jul. 23, 2015 (KR) .......................... 10-2015-0104573

(51) Int. Cl.
*F16H 3/00* (2006.01)
*F16H 3/08* (2006.01)
*F16H 3/093* (2006.01)

(52) U.S. Cl.
CPC ..... *F16H 3/006* (2013.01); *F16H 2003/0822* (2013.01); *F16H 2003/0931* (2013.01); *F16H 2200/0069* (2013.01)

(58) Field of Classification Search
CPC ............. F16H 3/006; F16H 2003/0822; F16H 2003/0931; F16H 2200/0069

USPC .......................................................... 74/330
See application file for complete search history.

(56) References Cited

U.S. PATENT DOCUMENTS 3,589,483 A * 6/1971 Smith ................. F16H 3/097
192/3.52

FOREIGN PATENT DOCUMENTS

| JP | 11-51125 | * | 2/1999 |
|---|---|---|---|
| JP | 2008-202640 A | | 9/2008 |
| JP | 2008-309332 A | | 12/2008 |
| KR | 10-2008-0033700 A | | 4/2008 |
| KR | 10-2010-0062642 A | | 6/2010 |
| KR | 10-2011-0109514 A | | 10/2011 |
| KR | 10-2015-0040598 A | | 4/2015 |

* cited by examiner

*Primary Examiner* — William C Joyce
(74) *Attorney, Agent, or Firm* — Morgan, Lewis & Bockius LLP

(57) ABSTRACT

A transmission for vehicles may include first and second input shafts to selectively receive power of a drive source via first and second clutches, first and second output shafts parallel to the first and second input shafts, a shift device including gear pairs tooth-engaged with the first and second input shafts and the first and second output shafts and having different gear ratios, one gear pair conforming to a running speed being selected by a synchronizer to shift and output power of the drive source, and a reverse idler gear provided at a reverse idler shaft to be tooth-engaged with an input gear of the first or second input shaft and tooth-engaged with an output gear of the first or second output shaft, the reverse idler gear being selected by a reverse synchronizer to transmit power from the input gear to the output gear.

8 Claims, 3 Drawing Sheets

FIG. 3

| | CLUTCH | | SYNCHRO-SHIFING (10 SPEEDS) | | | | | | | | | | |
|---|---|---|---|---|---|---|---|---|---|---|---|---|---|
| | C1 | C2 | S1 | S2 | S3 | S4 | S5 | S6 | S7 | S8 | S9 | S10 | SR |
| R | | ● | ● | | | | | | | | | | ● |
| 1 | ● | | ● | | | | | | | | | | |
| 2 | | ● | | ● | | | | | | | | | |
| 3 | ● | | | | ● | | | | | | | | |
| 4 | | ● | | | | ● | | | | | | | |
| 5 | ● | | | | | | ● | | | | | | |
| 6 | | ● | | | | | | ● | | | | | |
| 7 | ● | | | | | | | | ● | | | | |
| 8 | | ● | | | | | | | | ● | | | |
| 9 | ● | | | | | | | | | | ● | | |
| 10 | | ● | | | | | | | | | | ● | |

TRANSMISSION FOR VEHICLE

CROSS-REFERENCE TO RELATED APPLICATION

The present application claims the priority benefit of Korean Patent Application No. 10-2015-0104573, filed Jul. 23, 2015, the disclosure of which is incorporated herein by reference.

BACKGROUND OF THE INVENTION

Field of the Invention

The present invention relates to a transmission for vehicles, and more particularly to a transmission for vehicles, which has a greater number of shift-stages with a reduced overall length.

Description of Related Art

In recent years, in response to high oil prices and the need to comply with environmental regulations regarding $CO_2$, the development of vehicles having improved fuel economy has become a critical issue. Hence, eco-friendly vehicles such as electric vehicles and hybrid vehicles, which achieve a reduction in the emission of harmful gases and improved fuel economy, have continuously been studied and developed.

However, electric vehicles are more expensive than general vehicles that use fossil fuel because the core components required for vehicle operation such as, for example, batteries and motors are considerably expensive, which has prevented the propagation of eco-friendly vehicles from being generalized.

Meanwhile, an automated manual transmission based on a synchronous meshing type manual shifting mechanism implements shifting in an automated manner using an actuator while a vehicle is being driven, thus providing driving convenience similar to an automatic transmission and contributing to improved fuel economy of a vehicle, owing to superior efficiency of power transmission to the automatic transmission.

In particular, a Dual Clutch Transmission (DCT) implements shifting via hand-over control, in which two clutches are controlled so as to cross each other when shifting gears, thereby preventing a deterioration in the shifting sensation that occurs when the power of the engine is broken off.

However, even in the case of the DCT, it is necessary to increase the number of shift-stages in order to further improve the fuel economy and marketability of the vehicle. In addition, it is necessary to minimize the overall length of the transmission in order to make it easier to install the multi-stage transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a transmission for vehicles, which has a greater number of shift-stages with a reduced overall length.

In accordance with the present invention, the above and other objects can be accomplished by the provision of a transmission for vehicles including a first input shaft and a second input shaft configured to selectively receive power of a drive source via a first clutch and a second clutch, a first output shaft and a second output shaft arranged parallel to the first input shaft and the second input shaft, a shift device including a plurality of gear pairs tooth-engaged with the first input shaft and the second input shaft and with the first output shaft and the second output shaft, the gear pairs having different gear ratios, one gear pair conforming to a running speed being selected by a synchronizer so as to shift and output the power of the drive source, and a reverse idler gear provided at a reverse idler shaft, the reverse idler gear being tooth-engaged with an input gear provided at the first input shaft or the second input shaft and tooth-engaged with an output gear provided at the first output shaft or the second output shaft, the reverse idler gear being selected by a reverse synchronizer so as to transmit power provided from the input gear to the output gear.

The reverse idler gear may include a first idler gear and a second idler gear, and the first idler-gear may be tooth-engaged with an input gear provided at the second input shaft and the second idler-gear may be tooth-engaged with an output gear provided at the first output shaft such that the first idler gear and the second idler gear are rotated relative to the reverse idler shaft, and the reverse synchronizer may be configured to be coupled to the first idler gear and the second idler gear so as to rotate along with the same.

The reverse synchronizer may be fixed to the first idler gear or the second idler gear.

The first idler gear or the second idler gear may be tooth-engaged with a gear pair, having the highest gear ratio, among the gear pairs provided at the shift device.

A plurality of input gears and output gears, configured to form odd-number stages, may be tooth-engaged respectively with the first input shaft, the first output shaft, and the second output shaft, and a plurality of input gears and output gears, configured to form even-number stages, may be tooth-engaged respectively with the second input shaft, the first output shaft, and the second output shaft.

Two gear pairs for formation of the odd-number stages may be configured to share a single input gear, and two gear pairs for formation of the even-number stages may be configured to share a single input gear.

The gear-pairs for formation of the first stage, the third stage, and the seventh stage may be tooth-engaged with the first input shaft and the first output shaft, the gear pairs for formation of the fifth stage and the ninth stage may be tooth-engaged with the first input shaft and the second output shaft, and the gear-pairs for formation of the second stage, the fourth stage, and the eighth stage may be tooth-engaged with the second input shaft and the first output shaft, and the gear pairs for formation of the sixth stage and the tenth stage may be tooth-engaged with the second input shaft and the second output shaft, the gear pair for formation of the seventh stage and the gear pair for formation of the ninth stage may share an input gear, and the gear pair for formation of the eighth stage and the gear pair for formation of the tenth stage may share an input gear.

The first idler gear may be tooth-engaged with an input gear for formation of the sixth stage, and the second idler gear may be tooth-engaged with an output gear for formation of the first stage.

The gear pair for formation of the second stage and the gear pair for formation of the fourth stage may be tooth-engaged with each other by a second-stage and fourth-stage synchronizer, the gear pair for formation of the first stage and the gear pair for formation of the eighth stage may be tooth-engaged with each other by a first-stage and eighth-stage synchronizer, the gear pair for formation of the third stage and the gear pair for formation of the seventh stage may be tooth-engaged with each other by a third-stage and seventh-stage synchronizer, the gear pair for formation of the sixth stage and the gear pair for formation of the tenth stage may be tooth-engaged with each other by a sixth-stage and tenth-stage synchronizer, and the gear pair for formation of the fifth stage and the gear pair for formation of the ninth stage may be tooth-engaged with each other by a fifth-stage and ninth-stage synchronizer.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is an operating table for respective shift-stages of the transmission illustrated in FIG. 1.

Figure 1:
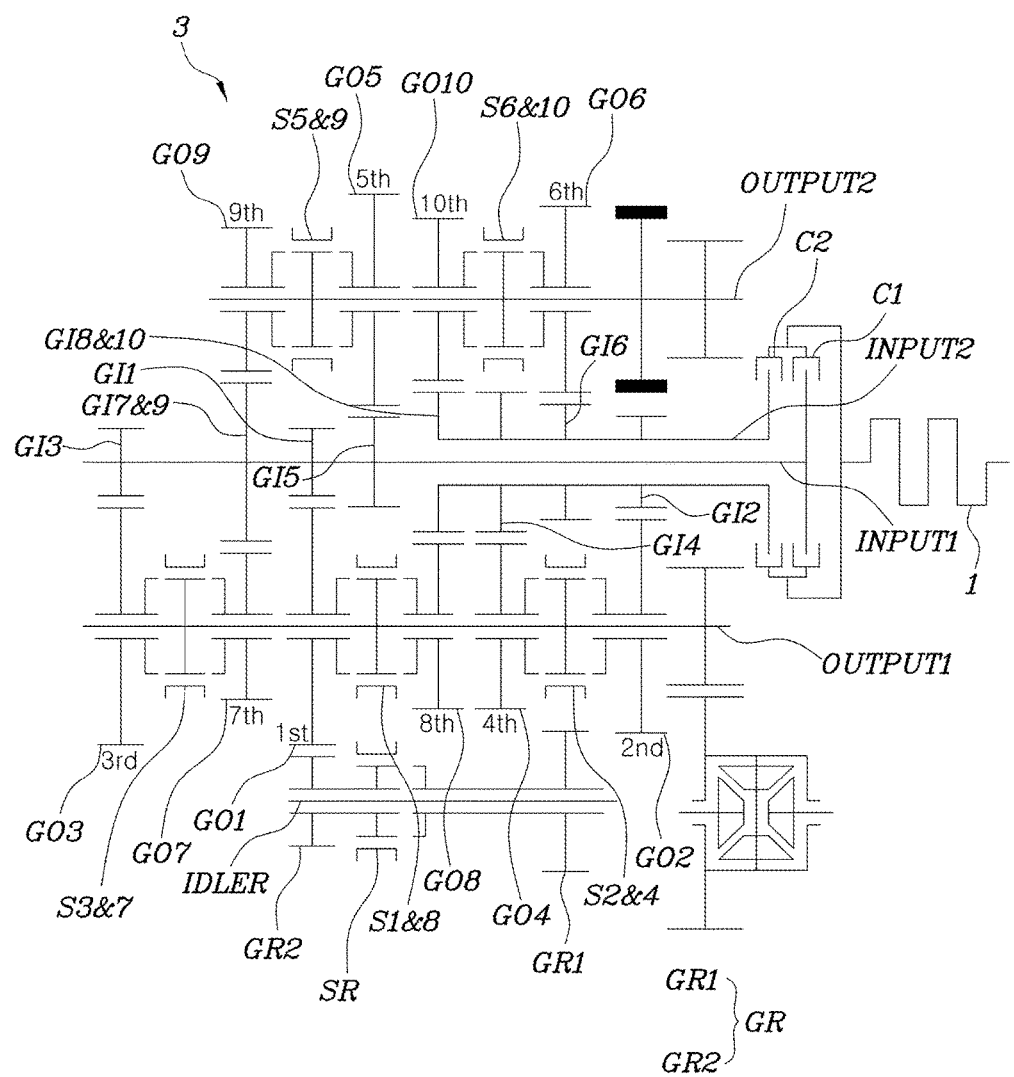
FIG. 1 is a view explaining the layout structure of a transmission for vehicles according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EXEMPLARY EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

A transmission for vehicles according to the present invention may generally include a first input shaft INPUT1, a second input shaft INPUT2, a first output shaft OUTPUT1, a second output shaft OUTPUT2, a shift device 3, and a reverse idler gear GR.

Considering the present invention in detail with reference to FIG. 1, the first input shaft INPUT1 may selectively receive power of an engine 1 via a first clutch C1, and the second input shaft INPUT2 may selectively receive power of the engine 1 via a second clutch C2.

For example, the second input shaft INPUT2 may take the form of a hollow shaft so as to allow the first input shaft INPUT1 to be coaxially inserted thereinto.

The first output shaft OUTPUT1 may be arranged parallel to the first input shaft INPUT1 and the second input shaft INPUT2, and the second output shaft OUTPUT2 may be arranged parallel to the first input shaft INPUT1 and the second input shaft INPUT2.

The shift device 3 may be configured such that a plurality of gear pairs, which have different gear ratios, are tooth-engaged with the first input shaft INPUT1, the second input shaft INPUT2, the first output shaft OUTPUT1, and the second output shaft OUTPUT2, and any one gear pair, which conforms to the running speed, is selected by a synchronizer so as to shift and output the power of the drive source, i.e. the engine 1.

The reverse idler gear GR may be provided to rotate relative to a reverse idler shaft IDLER. At this time, the reverse idler shaft IDLER may be arranged parallel to the second input shaft INPUT2 and the first output shaft OUTPUT1.

In addition, the reverse idler gear GR may be tooth-engaged with an input gear provided at the first input shaft INPUT1 or the second input shaft INPUT2, and may also be tooth-engaged with an output gear provided at the first output shaft OUTPUT1 or the second output shaft OUTPUT2.

For example, the reverse idler gear GR may include a first idler gear GR1 and a second idler gear GR2. The first idler gear GR1 may be tooth-engaged with the input gear provided at the second input shaft INPUT2, and the second idler gear GR2 may be tooth-engaged with the output gear provided at the first output shaft OUTPUT1.

In addition, any one of the first idler gear GR1 and the second idler gear GR2 may be configured to be tooth-engaged with one gear pair, having the highest gear ratio, among the gear pairs provided at the shift device 3.

For example, the first idler gear GR1 or the second idler gear GR2 may be tooth-engaged with an output gear for formation of the first stage, and the other idler gear may be tooth-engaged with any one input gear selected from among the other gear pairs excluding the first-stage gear pair.

In particular, the reverse idler gear GR may be selected by a reverse synchronizer SR so as to transmit power provided from the input gear to the output gear. A reverse stage may be formed via the coupling of the reverse synchronizer SR.

For example, the reverse synchronizer SR may be configured such that the first idler gear GR1 and the second idler gear GR2 are coupled to the reverse synchronizer SR so as to rotate together.

Preferably, the reverse synchronizer SR may be fixed to any one of the first idler gear GR1 and the second idler gear GR2, so as to allow the first idler gear GR1 and the second idler gear GR2 to be rotated together.

In addition, in the present invention, a plurality of input gears and output gears, which form odd-number stages, may be tooth-engaged respectively with the first input shaft INPUT1 and the first output shaft OUTPUT 1 and with the first input shaft INPUT1 and the second output shaft OUTPUT2.

In addition, a plurality of input gears and output gears, which form even-number stages, may be tooth-engaged respectively with the second input shaft INPUT2 and the first output shaft OUTPUT 1 and with the second input shaft INPUT2 and the second output shaft OUTPUT2.

In particular, in the present invention, two gear pairs that form odd-number stages may be configured to share a single input gear, and two gear pairs that form even-number stages may be configured to share a single input gear.

For example, referring to FIG. 1, gear pairs that form the first stage, the third stage, and the seventh stage may be tooth-engaged with the first input shaft INPUT1 and the first output shaft OUTPUT1, and gear pairs that form the fifth stage and the ninth stage may be tooth-engaged with the first input shaft INPUT1 and the second output shaft OUTPUT2.

In addition, gear pairs that form the second stage, the fourth stage, and the eighth stage may be tooth-engaged with the second input shaft INPUT2 and the first output shaft OUTPUT1, and gear pairs that form the sixth stage and the tenth stage may be tooth-engaged with the second input shaft INPUT2 and the second output shaft OUTPUT2.

At this time, the gear pair that forms the seventh stage and the gear pair that forms the ninth stage may be configured to share an input gear, and the gear pair that forms the eighth stage and the gear pair that forms the tenth stage may be configured to share an input gear.

That is, a seventh-stage and ninth-stage input gear GI7&9, which forms the seventh stage and the ninth stage, may be tooth-engaged with a seventh-stage output gear G07 and a ninth-stage output gear G09, and an eighth-stage and tenth-stage input gear GI8&10, which forms the eighth stage and the tenth stage, may be tooth-engaged with an eighth-stage output gear G08 and a tenth-stage output gear G10.

In the structure described above, the first idler gear GR1 may be tooth-engaged with an input gear GI6 that forms the sixth stage, and the second idler gear GR2 may be tooth-engaged with an output gear G01 that forms the first-stage.

In addition, the first output shaft OUTPUT1 may be provided with a second-stage and fourth-stage synchronizer S2&4 between a second-stage output gear G02 and a fourth-stage output gear G04, may be provided with a first-stage and eighth-stage synchronizer S1&8 between a first-stage output gear G01 and an eighth-stage output gear G08, and may be provided with a third-stage and seventh-stage synchronizer S3&7 between a third-stage output gear G03 and a seventh-stage output gear G07.

In addition, the second output shaft OUTPUT2 may be provided with a sixth-stage and tenth-stage synchronizer S6&10 between a sixth-stage output gear G06 and a tenth-stage output gear G10, and may be provided with a fifth-stage and ninth-stage synchronizer S5&9 between a fifth-stage output gear G05 and a ninth-stage output gear G09. In addition, a parking gear may be located at the side of the sixth-stage output gear G06.

With the configuration described above, in the present invention, because some of the gear pairs provided at the shifting device 3 share input gears with other gear pairs, the space required for the arrangement of the input gears is reduced, which may reduce the overall length of the transmission and consequently increase the number of shift-stages despite the reduced overall length of the transmission.

Hereinafter, a power transmission path that is created when the transmission according to the present invention forms a reverse stage will be described.

<Reverse Driving>

Figure 2:
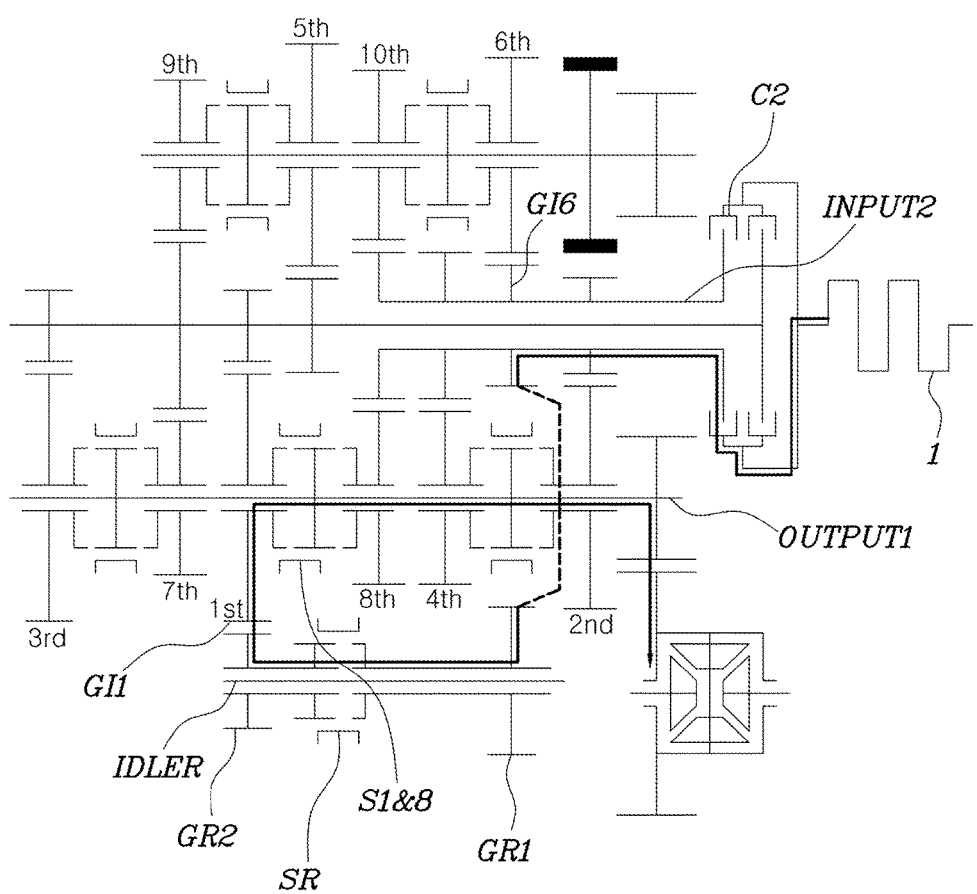
FIG. 2 is a view illustrating a power transmission path of the transmission for vehicles during reverse movement according to the present invention.

Referring to FIG. 2, the first idler gear GR1 and the second idler gear GR2 are coupled to each other by the reverse synchronizer SR, and the second clutch C2 is coupled in the state in which the first-stage output gear G01 is selected by the first-stage and eighth-stage synchronizer S1&8.

Thereby, the power of the engine 1 is transmitted to the sixth-stage input gear GI6 through the second input shaft INPUT2, and is in turn transmitted from the sixth-stage input gear GI6 to the first-stage output gear G01 through the first idler gear GR1 and the second idler gear GR2.

Subsequently, the power is transmitted from the first-stage output gear G01 to the first output shaft OUTPUT1. As such, the power of the engine 1 corresponding to a reverse speed R may be output to the differential side.

For reference, in the case of the other forward driving stages, as illustrated in the shifting operating Table of FIG. 3, each shift-stage may be formed to enable driving via coupling between each synchronizer and gear pairs that form the corresponding shift-stage.

As is apparent from the above description, the present invention may increase the number of shift-stages of a transmission without a considerable increase in the number of components (e.g., gears and shafts) required for shifting, thereby reducing the price and weight of the transmission. In particular, as some of gear pairs provided at a shift device share input gears with other gear pairs, the space required for the arrangement of the input gears is reduced, which results in a reduction in the overall length of the transmission.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:
1. A transmission for vehicles comprising:
a first input shaft and a second input shaft configured to selectively receive power of a drive source via a first clutch and a second clutch;
a first output shaft and a second output shaft arranged parallel to the first input shaft and the second input shaft;
a shift device including a plurality of gear pairs tooth-engaged With the first input shaft and the second input shaft and with the first output shaft and the second output shaft, the gear pairs having different gear ratios, one gear pair conforming to a running speed being selected by a synchronizer to shift and output the power of the drive source; and
a reverse idler gear provided at a reverse idler shaft, the reverse idler gear being tooth-engaged with an input gear provided at the first input shaft or the second input shaft and tooth-engaged with an output gear provided at the first output shaft or the second output shaft, the reverse idler gear being selected by a reverse synchronizer to transmit power provided from the input gear to the output gear,
wherein the gear-pairs for formation of a first stage, a third stage, and a seventh stage are tooth-engaged with the first input shaft and the first output shaft;
wherein the gear pairs for formation of a fifth stage and a ninth stage are tooth-engaged with the first input shaft and the second output shaft;
wherein the gear-pairs for formation of a second stage, a fourth stage, and an eighth stage are tooth-engaged with the second input shaft and the first output shaft;

wherein the gear pairs for formation of a sixth stage and a tenth stage are tooth-engaged with the second input shaft and the second output shaft;

wherein the gear pair for formation of the seventh stage and the gear pair for formation of the ninth stage share a first input gear; and wherein the gear pair for formation of the eighth stage and the gear pair for formation of the tenth stage share a second input gear.

2. The transmission according to claim 1,
wherein the reverse idler gear includes a first idler gear and a second idler gear, and the first idler-gear is tooth-engaged with an input gear provided at the second input shaft and the second idler-gear is tooth-engaged with an output gear provided at the first output shaft such that the first idler gear and the second idler gear are rotated relative to the reverse idler shaft; and wherein the reverse synchronizer is coupled to the first idler gear and the second idler gear to rotate along with the same.

3. The transmission according to claim 2, wherein the reverse synchronizer is fixed to the first idler gear or the second idler gear.

4. The transmission according to claim 2, wherein the first idler gear or the second idler gear is tooth-engaged with a gear pair, having a highest gear ratio, among the gear pairs provided at the shift device.

5. The transmission according to claim 2,
wherein a plurality of input gears and output gears, configured to form odd-number stages of the first, third, fifth, seventh and ninth stages, are tooth-engaged respectively with the first input shaft, the first output shaft, and the second output shaft; and wherein a plurality of input gears and output gears, configured to form even-number stages of the second, fourth, sixth, eighth, and tenth stages, are tooth-engaged respectively with the second input shaft, the first output shaft, and the second output shaft.

6. The transmission according to claim 5,
wherein two gear pairs for formation of the odd-number stages of the seventh stage and the ninth stage are configured to share the first input gear; and wherein two gear pairs for formation of the even-number stages of the eight stage and the tenth stage are configured to share the second input gear.

7. The transmission according to claim 2,
wherein the first idler gear is tooth-engaged with an input gear for formation of the sixth stage; and wherein the second idler gear is tooth-engaged with an output gear for formation of the first stage.

8. The transmission according to claim 1,
wherein the gear pair for formation of the second stage and the gear pair for formation of the fourth stage are tooth-engaged with each other by a second-stage and fourth-stage synchronizer;

wherein the gear pair for formation of the first stage and the gear pair for formation of the eighth stage are tooth-engaged with each other by a first-stage and eighth-stage synchronizer;

wherein the gear pair for formation of the third stage and the gear pair for formation of the seventh stage are tooth-engaged with each other by a third-stage and seventh-stage synchronizer;

wherein the gear pair for formation of the sixth stage and the gear pair for formation of the tenth stage are tooth-engaged with each other by a sixth-stage and tenth-stage synchronizer; and wherein the gear pair for formation of the fifth stage and the gear pair for formation of the ninth stage are tooth-engaged with each other by a fifth-stage and ninth-stage synchronizer.

* * * * *